United States Patent [19]

Hubinger

[11] Patent Number: 5,675,557
[45] Date of Patent: Oct. 7, 1997

[54] INTEGRATED MIXING SYSTEM FOR SYNCHRONIZING VIDEO AND AUDIO SIGNALS

[75] Inventor: Hans Roland Hubinger, Vinaros, Spain

[73] Assignee: Carlos Lores Borras, Vinaros, Spain; a part interest

[21] Appl. No.: 407,025

[22] PCT Filed: Jul. 27, 1994

[86] PCT No.: PCT/ES94/00075

§ 371 Date: Jun. 2, 1995

§ 102(e) Date: Jun. 2, 1995

[87] PCT Pub. No.: WO95/04410

PCT Pub. Date: Feb. 9, 1995

[30] Foreign Application Priority Data

Jul. 29, 1993 [ES] Spain .................. E9301704

[51] Int. Cl.⁶ .................. H04B 1/20
[52] U.S. Cl. .................. 369/4; 381/119
[58] Field of Search .................. 369/4, 2, 3, 5; 381/119, 58, 80–81, 87–88; 360/22, 19.1, 24, 18

[56] References Cited

U.S. PATENT DOCUMENTS

| | | |
|---|---|---|
| 4,001,498 | 1/1977 | Morishita et al. .................. 358/160 |
| 4,351,007 | 9/1982 | Youngguist .................. 360/13 |
| 5,054,077 | 10/1991 | Suzuki .................. 381/109 |
| 5,151,998 | 9/1992 | Capps .................. 395/800 |
| 5,212,733 | 5/1993 | DeVitt et al. .................. 381/119 |
| 5,444,676 | 8/1995 | Balsamo et al. .................. 369/4 |

FOREIGN PATENT DOCUMENTS

| | | |
|---|---|---|
| 0 291 028 | 11/1988 | European Pat. Off. .. |
| 0 309 298 | 3/1989 | European Pat. Off. .. |
| 0 310 256 | 4/1989 | European Pat. Off. .. |
| 0 313 359 | 4/1989 | European Pat. Off. .. |

*Primary Examiner*—Ali Neyzari
*Attorney, Agent, or Firm*—Jacobson, Price, Holman & Stern, PLLC

[57] ABSTRACT

The manipulator for mixing sound and/or image of digital and/or analog supports comprises a manual rotary device which is manipulated by the operator who turns it into any direction and stops it in order to advance, delay or stop the sound and/or image; at least an input for compact disc, mini-disc, laser disc and an external source optionally with Data BUS, with the corresponding extraction devices for the position on the disc, the time, the BMP compass measurement, buttons which select the track, dB measuring unit, potentiometer; a fast or slow forward/backward motion control; a strip; a dB input control; a stop control; a recording control; a stroboscope or the like; and an operation initiating control.

7 Claims, 1 Drawing Sheet

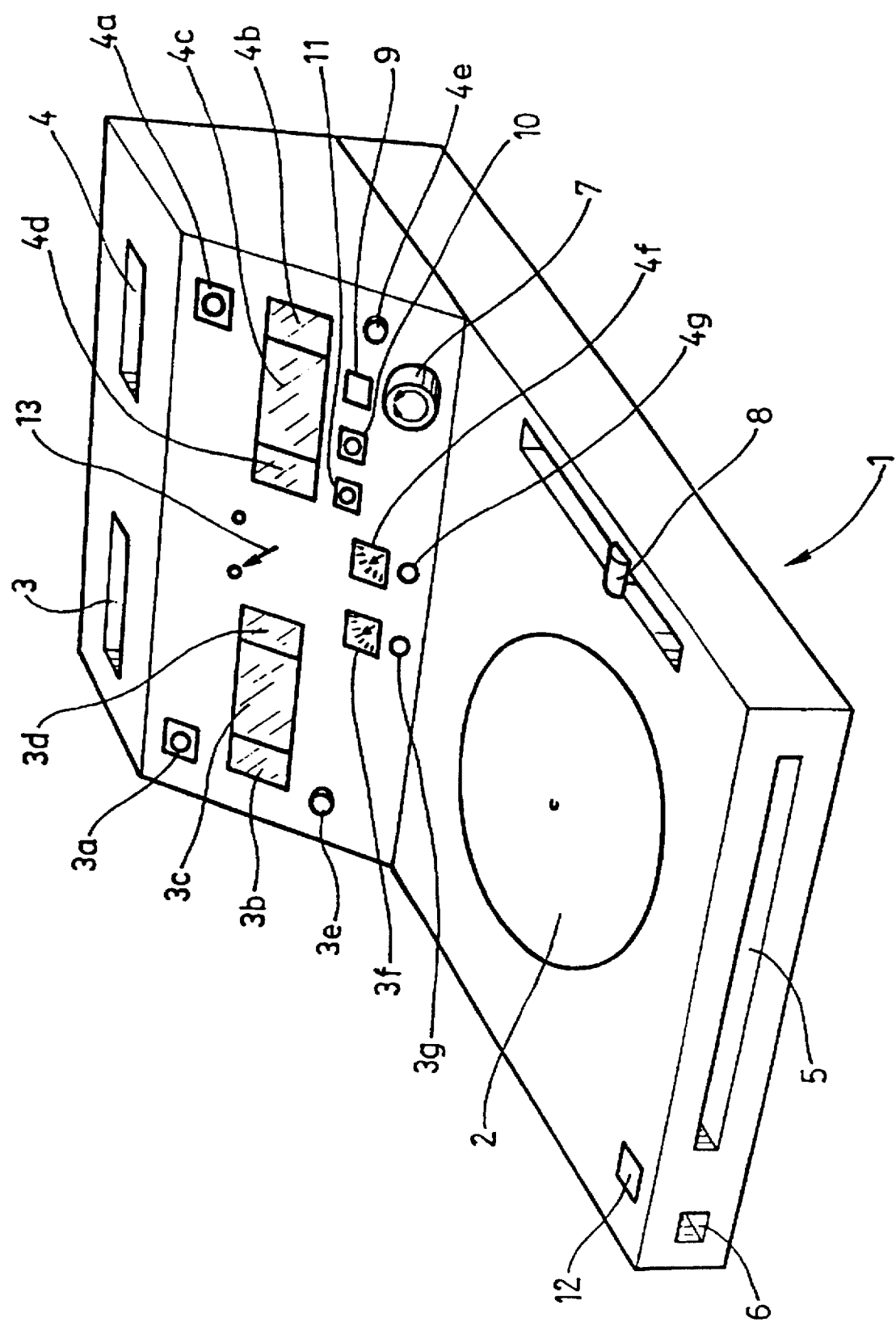

5,675,557

INTEGRATED MIXING SYSTEM FOR SYNCHRONIZING VIDEO AND AUDIO SIGNALS

BACKGROUND OF THE INVENTION

1. Field of the Invention

This invention refers to a manipulator for mixing sound and or/image of digital and/or analog supports.

2. Description of the Related Art

Until now, the system of mixing sound from two conventional vinyl records in musical environments, discotheques, etc. is known.

There is the U.S. Pat. No. 5,212,733 which comprises a system for computerised control of a musical mix. Icons appear on a screen which represent musical instruments, which can be located in a simulated bidimensional space. Although intended for controlling MIDI instruments, it is cited as an example of computerised control. This patent makes it possible, using a computer, to equalize the different instruments of an edited piece of music, in such a way that the volume of one or several of them is accented to a greater or lesser extent, in other words, it relates the possibility of "interpretation" of the piece of music using a computer.

To the contrary, this invention has as its objective a simulator of the record deck habitually used by professionals on radio stations and in discotheques which, worked by the operator, effects the mixing of pieces of music which are already edited (not of the instruments of which they are made up), synchronising (in real time) rhythms, as used to be done with vinyl records. The user's action is manual, enabling the professional to be creative.

The U.S. Pat. No. 5,054,077 relates the layout of a traditional mixing console with sliding faders. This invention incorporates a microcomputer, which can slide the faders, which can also be activated manually, controlling the motors. Using a program, this patent automates a large part of the equalizing of the edition of pieces of music, for example MIDI, in studios, for recording purposes, leaving the option of manual action open. It is a motorised fader for a mixing desk.

The EP-0 313 359 patent comprises a Jukebox, designed especially for handling compact discs. This patent has in common with this invention solely the working of digital audiovisual back-up systems, with similar solutions to those already known of the classic jukeboxes with vinyl record back-ups, the function being the same.

The EP 0 310 256 patent shows a recorder which plays back several audio tapes laid out in a magazine, controlled under the action of a control unit. There are several recording, playback actions which can be carried out in sequence on each tape, or as a block. Previous Jukebox solutions for audio tapes are also adapted in this patent.

The EP 0 309 298 patent presents a digital editing system for audio tapes, upon request for an automated selling point. The digitalised information on a videodisc is copied at a speed mode which is faster than the usual, using a "burst" mode transfer. In other words, this patent consists of a system for editing and copying audio tapes, designed for recording personalised tapes as per the customer's preference from a list of tracks with immediate delivery.

The EP 0 291 028 patent relates a system for disc-storage of information, on concentric tracks, whether video or audio, with devices to discriminate automatically the type of information contained in the medium, reading it from this medium.

None of the above patents has the objective of this invention with regard to the editing control using a handling device in the form of a record, nor do they use the technical means employed in this invention.

Up until now, it has not been possible to mix the sound from a compact disc or similar with a conventional record, minidisc, laser disc, video, etc. for playback of the sound and/or image, mixed in a synchronised fashion, efficiently and comfortably.

SUMMARY OF THE INVENTION

This invention's manipulator enables synchronised mixing of the sound and/or image, by working a turntable which acts as a simulation of a conventional record.

As per the invention, the manipulator for mixing sound and/or image of digital and/or analog supports comprises:

a manual device which turns, on principle and preferably at 45 r.p.m., via which the operator works, turning it in either direction or stopping it to go forward, back, or to stop the sound and/or image, sourced from digital and/or analogue audiovisual back-up systems of sound and/or image indistinctly, which has a ring and/or disc shaped configuration, substantially in the manner of a conventional vinyl record; at least one input for compact disc (CD), minidisc (MD), laser disc (LD) and an auxiliary source, facultatively with Data BUS, each input being equipped with the respective eject buttons, displays for the position on the disc/record (the track), tempo displays, BPM (beats per minute) metronome display, track selection buttons, (VU meters) in the left channel/right channel, minidisc (MD) recording input fader, in the event there is a minidisc input; fast or slow forward/backward (jog/shuttle) control; a pitch to control the operating speed, via the manual turntable and any one of the aforesaid CD, MD, LD or auxiliary source inputs; a VU input control which allows in the auxiliary signal to control the dB level; an auxiliary stop control; an auxiliary recording (REC) control; a stroboscope or equivalent, which acts as a speed and direction meter, located under the manual turntable, with the relevant control button; and a start play button; all of which is laid out in a housing, preferably console type with desk, connected to the mains and with the pertinent connections between the various devices, the layout of which enables the sound and/or image to be mixed in a synchronised fashion from at least one digital audiovisual back-up system, such as a compact disc (CD), minidisc (MD), laser disc (LD) and other incorporated and/or auxiliary sources, facultatively with data BUS, by working the manual turntable which acts as a simulation of a conventional record and which has the function of synchronising the sound and/or image of the auxiliary components in the last spaces of the synchronism required, in combination with the adjustment of the thickness of the pitches.

These and other characteristics can be explained more succinctly in the detailed description which follows, to aid which a sheet of drawings is attached, displaying a practical case of application, which is cited for illustration purposes only and not limitatively of the scope of this invention.

BRIEF DESCRIPTION OF THE DRAWINGS

In the single figure, a preferred form of application of the manipulator as per the invention is shown.

DETAILED DESCRIPTION OF THE PREFERRED EMBODIMENTS

The manipulator object of this invention, identified with the general reference 1, comprises a housing, preferably console type with desk, and comprises a manual turntable 2 which is worked by the operator, turning it in either direction or stopping it whereby it moves forwards, backwards or stops the sound and/or image sourced from the digital and/or analogue audiovisual back-up systems of sound and/or image which will be described below, the manual turntable 2 of which preferably has a ring and/or disc shaped configuration—as illustrated—the disc shaped configuration having an appearance similar to a conventional vinyl record.

The manipulator comprises an input for compact disc (CD) 3, minidisc (MD) 4, laser disc (LD) 5 and an auxiliary source 6 equipped facultatively with data BUS. Each input is equipped with the corresponding eject buttons, 3a and 4a respectively for the CD and MD, displays 3b and 4b for the track position (for the CD and MD), displays 3c and 4c for the tempo (for CD and MD), displays 3d and 4d for the BPM (beats per minute) metronome (in other words, the speed of the rhythm for CD and MD), fader buttons 3e and 4e which select the track (for CD and MD), VU meters 3f and 4f in the left channel/right channel, fader 3g and 4g for minidisc (MD) recording input, in the event there is a minidisc input.

Likewise, the apparatus comprises a control 7 for fast or slow (jog/shuttle) forward/backward; a pitch 8 which controls the speed of whatever is operating, via the manual turntable 2 and any one of the aforesaid inputs 3 for CD, 4 for MD, 5 for LD or 6 for auxiliary source; a dB input control 9 which allows in the auxiliary signal to control the dB level; an auxiliary stop control 10; an auxiliary recording (REC) control 11; a stroboscope or equivalent which acts as a speed meter, located under the manual turntable 2; and a start play control 12.

The manipulator apparatus is connected to the mains and is equipped with the pertinent connections between the various devices, the layout of which enables the sound and/or image to be mixed in a synchronised fashion from at least one digital and/or analogue audiovisual back-up system, such as a compact disc (CD), minidisc (MD), laser disc (LD) and other incorporated and/or auxiliary sources, facultatively equipped with data BUS, by working the manual turntable 2 which acts as a simulation of a conventional record.

This invention comprises a source selector 13 which enables the device which is to be worked to be selected (CD, MD, LD, data BUS, etc.).

As per the invention, the manual turntable 2 has a continuous disc shaped surface—as illustrated—which disc shaped surface can be flat in the ring shaped, central and peripheral areas and concave in the intermediate central area to make it easier for the user to handle. This manual turntable 2 can consist of a conventional vinyl record or a disc of any material, with or without central grooves.

As can be seen in the drawing, the manual turntable with the speed meter located below are on principle laid out on the console, and—as illustrated—the input for the laser disc (LD) can also be laid out with, if applicable, the eject buttons, track display, tempo display, BPM metronome display, etc., not illustrated. Likewise, the console also houses the fast forward/backward control and the pitch for speed control. Meanwhile, the desk should preferably house the other inputs (CD, MD and others), the displays, and the remaining buttons and controls. Naturally, the layout of these components may be other than that illustrated and described.

In the operation of the manipulator apparatus as per this invention, the manual turntable 2 starts to operate when the start button 12 is pressed, and the turntable 2 stops when said button 12 is stopped. When operation is started, firstly the sound and/or image of an audiovisual back-up system is synchronised in relation to another from a pair of them (for example: CD and MD or any combination in pairs from the inputs indicated), and then using the turntable 2, the sound and/or image of both audiovisual back-up systems as selected is mixed, to do which the said turntable is worked by the operator, turning it in either direction, stopping it, etc., as required, obtaining from this the synchronised mixing of the image and/or sound from both audiovisual back-up systems, whether digital or analogue.

As per the invention, the manipulator may incorporate all the devices illustrated, or just some of them. In the same way, the auxiliary source (data BUS) may be connected to a computer, in the digital back-up systems of which (hard disc or equivalent) connections, image and further data may be recorded.

I claim:

1. An integrated mixer system for mixing video and audio signals having digital and analog elements to form an output, said mixing system comprising:

a housing having a desk and a console;

a manually and bi-directionally rotatable turntable unit located in the desk of said housing and having a turntable output;

a compact disc unit located in the desk of said housing for playing a compact disc and having an eject button for ejecting the compact disc, a track selection button for selecting a track to be played from the compact disc, and a compact disc output, wherein the eject button and track selection button are located on the console of said housing;

a compact disc unit display located on the console for displaying a track being played from the compact disc, and for also displaying a tempo, beats per minute, and metronome of a track being played from the compact disc;

a minidisc unit located in the desk of said housing for playing a minidisc and having a recording input fader, an eject button for ejecting the minidisc, a track selection button for selecting a track to be played from the minidisc and a minidisc output, wherein the eject button and track selection button are located on the console of said housing;

a minidisc unit display located on the console for displaying a track being played from the minidisc, and for also displaying a tempo, beats per minute, and metronome of a track being played from the minidisc;

a laser disc unit located in the desk of said housing for playing a laser disc and having an eject button for ejecting the laser disc, a track selection button for selecting a track to be played from the laser disc, and an laser disc output, wherein the eject button and track selection button are located on the console of said housing;

an auxiliary source unit having an auxiliary source input located in the desk of said housing for receiving data over an input line from an auxiliary source, an auxiliary stop control, an auxiliary recording control, an auxiliary source output, and an auxiliary decibel control for controlling the decibel level of the auxiliary source output, wherein the auxiliary stop control, recording control and decibel control are each located on the console of said housing;

volume meters located on the console for displaying the volume of a right and left channel, respectively;

a source selector located on the console for selecting one of said turntable unit, compact disc unit, minidisc unit, laser disc unit, and auxiliary source unit and to provide the output of the selected unit as a selected system output;

a speed controller located on the console for controlling the selected system output to operate normal, fast, slow, and in a forward or reverse direction;

a pitch controller located on the console for synchronizing the selected system output by controlling the operating speed;

a start play control located on the console for turning the mixer system ON and OFF; and, wherein manual operation of said rotatable turntable operates to control the selected system output.

2. The mixer system of claim 1, wherein operating said turntable to stop, move forward or backward operates to stop, advance, delay or backtrack the selected system output by controlling operation of the selected unit.

3. The mixer system of claim 1, said turntable further comprising a stroboscope for displaying the speed of said turntable.

4. A mixer system for mixing video and audio signals having digital and analog elements to form an output, said mixing system comprising:

a manually and bi-directionally rotatable turntable unit having a turntable output;

a compact disc unit for playing a compact disc and having an eject button for ejecting the compact disc, a track selection button for selecting a track to be played from the compact disc, and a compact disc output;

a minidisc unit for playing a minidisc and having a recording input fader, an eject button for ejecting the minidisc, a track selection button for selecting a track to be played from the minidisc and a minidisc output;

a laser disc unit for playing a laser disc and having an eject button for ejecting the laser disc, a track selection button for selecting a track to be played from the laser disc, and an laser disc output;

an auxiliary source unit having an auxiliary source input for receiving data over an input line from an auxiliary source, an auxiliary stop control, an auxiliary recording control, an auxiliary source output, and an auxiliary decibel control for controlling the decibel level of the auxiliary source output;

a source selector for selecting one of said turntable unit, compact disc unit, minidisc unit, laser disc unit, and auxiliary source unit and to provide the output of the selected unit as a selected system output;

a speed controller for controlling the selected system output to operate normal, fast, slow, and in a forward or reverse direction;

a pitch controller for synchronizing the selected system output by controlling the operating speed;

a start play control for turning the mixer system ON and OFF; and, wherein manual operation of said rotatable turntable operates to control the selected system output.

5. The mixer system of claim 4, wherein operating said turntable to stop, move forward or backward operates to stop, advance, delay or backtrack the selected system output by controlling operation of the selected unit.

6. The mixer system of claim 4, said turntable further comprising a stroboscope for displaying the speed of said turntable.

7. The mixer system of claim 4, further comprising a compact disc unit display for displaying a track being played from a compact disc, and for also displaying a tempo, beats per minute, and metronome of a track being played from a compact disc; and, a minidisc unit display for displaying a track being played from a minidisc, and for also displaying a tempo, beats per minute, and metronome of a track being played from a minidisc.

* * * * *